United States Patent
Meunier et al.

(10) Patent No.: US 11,500,403 B2
(45) Date of Patent: Nov. 15, 2022

(54) SYSTEM AND METHOD FOR POWER SUPPLY VOLTAGE SCALING FOR SECURE EMBEDDED SYSTEMS

(71) Applicant: NXP USA, INC., Austin, TX (US)

(72) Inventors: Jean-Philippe Meunier, Ayguesvives (FR); Maxime Clairet, Labastidette (FR); Alaa Eldin Y El Sherif, Plano, TX (US); Pierre Turpin, Toulouse (FR)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 17/204,257

(22) Filed: Mar. 17, 2021

(65) Prior Publication Data

US 2021/0294363 A1  Sep. 23, 2021

(30) Foreign Application Priority Data

Mar. 20, 2020 (EP) .................................. 20305291

(51) Int. Cl.
  *G05F 1/46* (2006.01)
  *B60R 16/02* (2006.01)
  *H03K 21/02* (2006.01)

(52) U.S. Cl.
  CPC .............. *G05F 1/46* (2013.01); *B60R 16/02* (2013.01); *H03K 21/02* (2013.01)

(58) Field of Classification Search
  CPC ......... G05F 1/46; B60R 16/02; B60R 16/023; B60R 16/0231–0235; H03K 21/02
  See application file for complete search history.

(56) References Cited

U.S. PATENT DOCUMENTS

| | | | |
|---|---|---|---|
| 2013/0041607 A1* | 2/2013 | Zimmerman | .... G01R 19/16542 702/63 |
| 2015/0007356 A1* | 1/2015 | Hauke | ..................... G06F 21/81 726/36 |
| 2021/0019208 A1* | 1/2021 | Sheperek | .............. G06F 11/073 |

FOREIGN PATENT DOCUMENTS

WO  2016204863 A1  12/2016

OTHER PUBLICATIONS

Freescale Semiconductor ("System Basis Chip with High Speed CAN Transceiver", Document No. MC33907_08, Rev. 3.0, Feb. 1, 2014,) (Year: 2014).*
Freescale Semiconductor, "System Basis Chip with High Speed CAN Transceiver", Document No. MC33907_08, Rev. 3.0, Feb. 1, 2014.
Sui, C., "Random Dynamic Voltage Scaling Design to Enhance Security of NCL S-Box", 2011 IEEE International Midwest Symposium on Circuits and Systems, Aug. 7-10, 2011.

(Continued)

*Primary Examiner* — Patrick C Chen

(57) ABSTRACT

A system-on-a-chip (SoC) is designed to operate within optimal voltage and frequency ranges. If an SoC is provided power outside of the optimal voltage range, the SoC can be placed in a high-stress state, exposing the chip to a security attack. Embodiments of the present systems and method limit the minimum and maximum voltage supplied to an SoC from a power management integrated circuit (PMIC). Embodiments can also track a number of requests to provide power outside of the optimal range and can signal a warning of repeated attempts to take an SoC outside of the SoC's optimal range, which may be indicative of a malicious attack on the system.

20 Claims, 5 Drawing Sheets

(56) References Cited

OTHER PUBLICATIONS

Tang, A., "CLKSCREW: Exposing the Perils of Security-Oblivious Energy Management", Proceedings of the 26th USENIX Security Symposium, ISBN: 978-1-931971-40-9, Aug. 16-18, 2017.
Yang, S., "Power Attack Resistant Cryptosystem Design: A Dynamic Voltage and Frequency Switching Approach", Design, Automation and Test in Europe, ISBN: 0-7695-228802, Mar. 7-11, 2005.

\* cited by examiner

SYSTEM AND METHOD FOR POWER SUPPLY VOLTAGE SCALING FOR SECURE EMBEDDED SYSTEMS

CROSS-REFERENCE TO RELATED APPLICATIONS

This application claims the priority under 35 U.S.C. § 119 of European Patent application no. 20305291.5, filed on 20 Mar. 2020, the contents of which are incorporated by reference herein.

BACKGROUND

Field

This disclosure relates generally to integrated circuits, and more specifically, to managing power for a system-on-a-chip in a manner that prevents a security breach through voltage scaling.

Related Art

Advances in the automotive industry have led to a technological transformation in the number of processors and connectivity present in a modern car. Typical automobiles have both remote connectivity and advanced technology features, such as engine control units and sensor systems providing information to infotainment systems with touch screen, all of which can be kept up-to-date with periodic software updates received over the air.

Today's vehicles not only have in-vehicle networks that allow communication between many of the processors present within the vehicle, but also transceivers that allow for vehicle-to-vehicle, vehicle-to-infrastructure, and vehicle-to-area communication. Such communication enables interaction of vehicles with other vehicles or surrounding infrastructure, including traffic lights, highways, or trains. Communication between a vehicle and the environment surrounding the vehicle is a precursor to autonomous cars, where communication and complex software handles all in-vehicle functionality. Connected and autonomous cars are an important part of the future infrastructure and providing security for the devices and networks that are part of that infrastructure is an important facet.

SUMMARY

Aspects of the disclosure are defined in the accompanying claims.

In a first aspect there is provided a method for providing power to a system-on-a-chip (SoC), the method comprising: providing a first voltage to the SoC; determining whether a requested change in voltage from the SoC is within a predetermined voltage range; applying the requested change in voltage to the SoC when the requested change is within the predetermined voltage range; and informing the SoC that the requested change in voltage is outside the predetermined voltage range when the requested change is outside the predetermined voltage range.

In one or more embodiments, said informing the SoC may comprise providing an interrupt signal to the SoC.

In one or more embodiments, the method may further comprise: incrementing a counter when the requested voltage is outside the predetermined voltage range; determining if the counter is above a pre-set threshold; sending a command to the SoC to enter a protective state when the counter is above the pre-set threshold.

In one or more embodiments, the protective state may be one of a safe state or a deep fail safe state.

In one or more embodiments, the protective state may be determined to be the safe state or the deep fail safe state in light of a pre-set safety reaction configuration variable value.

In one or more embodiments, said determining whether the requested change in voltage from the SoC is within a predetermined voltage range may comprise: storing a positive clamp value representing a highest positive voltage offset from a nominal voltage value; storing a negative clamp value representing a highest negative voltage offset from the nominal voltage value; and comparing the requested change in voltage from the SoC to one of the positive clamp value and the negative clamp value.

In one or more embodiments, said comparing the requested change in voltage to one of the positive clamp value and the negative clamp value may comprise: performing a logical AND on the requested change in voltage to the SoC and the one of the positive clamp value and the negative clamp value; and determining whether a result of the logical AND equals the requested change in voltage.

In one or more embodiments, the requested change in voltage, the positive clamp value, and the negative clamp value may be measured in fixed voltage step increments from the nominal voltage value.

In one or more embodiments, the method may further comprise storing the positive clamp value and the negative clamp value in an one-time programmable memory.

In a second aspect, there is provided a power management integrated circuit (PMIC), coupled to a system-on-a-chip (SoC), the PMIC comprising: a power generation module, coupled to the SoC, and configured to provide a voltage to the SoC; a communication interface, coupled to the SoC, and configured to receive a request to change voltage from the SoC; and a control logic, coupled to the power generation module and the communication interface, and configured to determine whether the requested change in voltage from the SoC is within a predetermined voltage range, instruct the power generation module to apply the requested change in voltage to the SoC when the requested change is within the predetermined voltage range, and inform the SoC that the requested change in voltage is outside the predetermined voltage range when the requested change is outside the predetermined voltage range.

In one or more embodiments, the PMIC may further comprise an interrupt signal output port, coupled to the control logic and an interrupt signal input port of the SoC, and configured to transmit an interrupt signal to the SoC from the PMIC, wherein said informing the SoC that the requested change in voltage is outside the predetermined voltage range comprises transmitting the interrupt signal to the SoC.

In one or more embodiments, the control logic may further comprise a counter register, wherein the control logic is further configured to increment the counter register when the requested voltage is outside the predetermined voltage range, determine if the counter register is above a pre-set threshold, and send a command to the SoC to enter a protective state when the counter register is above the pre-set threshold.

In one or more embodiments, the PMIC may further comprise a reset signal output port, coupled to the control logic and a corresponding reset signal input port of the SoC, and configured to transmit a reset signal to the SoC from the PMIC, wherein said sending the command to enter the protective state comprises transmitting the reset signal to the SoC.

In one or more embodiments, the PMIC may further comprise a one-time programmable memory, coupled to the control logic, and storing a configuration variable setting the protective state, wherein the protective state is one of a safe state or a deep fail safe state.

In one or more embodiments, the PMIC may further comprise a one-time programmable memory, coupled to the control logic, and storing a plurality of configuration variables, wherein the plurality of configuration variables comprises a positive clamp value representing a highest positive voltage offset from a nominal voltage value, and a negative clamp value representing a highest negative voltage offset from the nominal voltage value.

In one or more embodiments, the control logic performing said determining whether the requested change in voltage from the SoC is within a predetermined range may comprise the control logic being configured to compare the requested change in voltage from the SoC to one of the positive clamp value and the negative clamp value.

In one or more embodiments, the control logic performing said comparing the requested change in voltage from the SoC to one of the positive clamp value and the negative clamp value may comprise the control logic being configured to perform a logical AND on the requested change in voltage to the SoC and the one of the positive clamp value and the negative clamp value, and to determine whether a result of the logical AND equals the requested change in voltage.

In one or more embodiments, the requested change in voltage, the positive clamp value, and the negative clamp value may be measured in fixed voltage step increments from the nominal voltage value.

In a third aspect, there is provided a vehicle comprising: a plurality of network nodes, wherein one of the network nodes comprises a system-on-a-chip (SoC), e.g. a microcontroller unit (MCU); a network communicatively coupling the plurality of network nodes; and a power management integrated circuit (PMIC) coupled to the SoC. e.g. the microcontroller unit. The PMIC comprises a power generation module, coupled to the SoC/MCU, and configured to provide a voltage to the SoC/MCU, a communication interface, coupled to the SoC/MCU, and configured to receive a request to change voltage from the SoC/MCU, and a control logic, coupled to the power generation module and the communication interface, and configured to determine whether the requested change in voltage from the SoC/MCU is within a predetermined voltage range, to instruct the power generation module to apply the requested change in voltage to the SoC/MCU when the requested change is within the predetermined voltage range, and to inform the SoC/MCU that the requested change in voltage is outside the predetermined voltage range when the requested change is outside the predetermined voltage range.

In one or more embodiments, the PMIC control logic may further comprise: a counter register, wherein the control logic is further configured to increment the counter if the requested voltage is outside the predetermined voltage range; to determine if the counter is above a pre-set threshold; and to send a command to the MCU to enter a protective state when the counter is above the pre-set threshold.

BRIEF DESCRIPTION OF THE DRAWINGS EMBODIMENTS OF THE PRESENT INVENTION MAY BE BETTER UNDERSTOOD BY REFERENCING THE ACCOMPANYING DRAWINGS

The use of the same reference symbols in different drawings indicates identical items unless otherwise noted. The figures are not necessarily drawn to scale.

DETAILED DESCRIPTION

A system-on-a-chip (SoC) is designed to operate within optimal voltage and frequency ranges. If an SoC is provided power outside of the optimal voltage range, the SoC can be placed in a high-stress state, exposing the chip to a security attack. Embodiments of the present systems and method limit the minimum and maximum voltage supplied to an SoC from a power management integrated circuit (PMIC). Embodiments can also track a number of requests to provide power outside of the optimal range and can signal a warning of repeated attempts to take an SoC outside of the SoC's optimal range, which may be indicative of a malicious attack on the system.

Cyber attacks and system hacking are a growing threat in the automotive market and connectivity introduced by vehicle-to-everything (V2X) communication increases exposure of vehicular systems to attacks. Connectivity provides remote users having malicious intent another avenue to exploit weaknesses within automobile networks.

Automotive SoCs (e.g., microcontrollers (MCUs)) are designed to work within an optimal range of voltages to the core processors of those SoCs. Higher voltages allow the processors to operate more quickly, while lower voltages conserve power and can prolong a lifetime of the SoC. Varying power is supplied to an SoC by a power management integrated circuit (PMIC).

A PMIC can vary power supplied to a SoC using static voltage scaling (SVS) or dynamic voltage scaling (DVS). Software executing on processors in an SoC can request a rise in voltage or a lowering of voltage from the PMIC. The primary difference between SVS and DVS is that SVS changes the output voltage of the core voltage supply only during the initialization phase of the PMIC when the system is in a safe state, while DVS allows for the SoC to request a change in output voltage of the core voltage supply in a variety of operational modes (e.g., initialization and normal mode) with no limitation in the number of iterations of such changes.

The ability to change core voltage supply to a SoC provides another security weakness for the SoC. For example, in response to a voltage change request, the PMIC can be requested to change the output voltage core supply to set a voltage point below or higher than a nominal voltage value and near the marginal voltage limits of the SoC. Concurrently, the frequency of the SoC and loadings on the SoC can be changed to put the SoC in a high-stress state that opens the SoC to a security breach. Today's SoCs can request to change a voltage set point under SVS or DVS with complete freedom because such requests are a normal use case for a SoC/PMIC combination.

Figure 1:
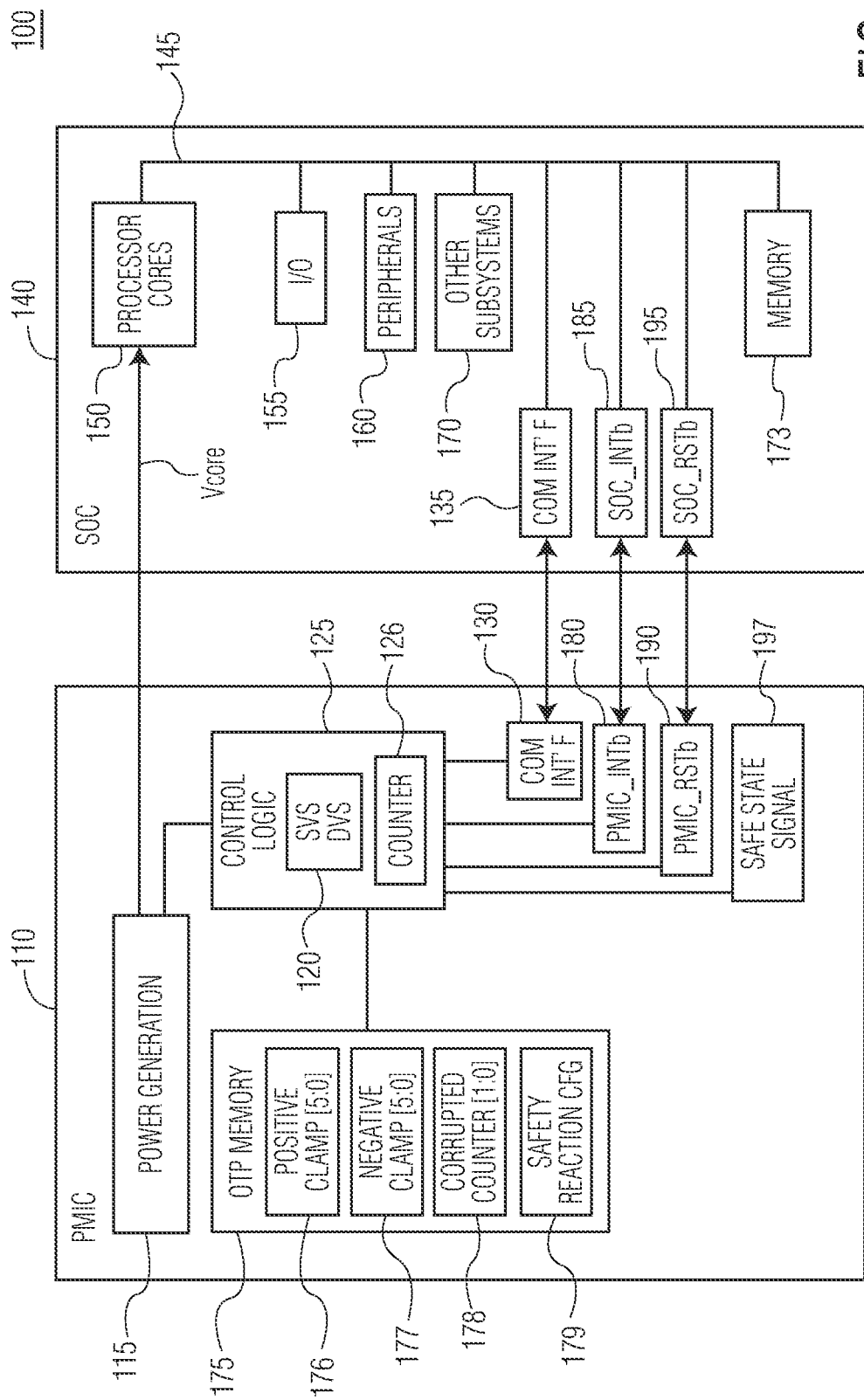
FIG. 1 is a simplified block diagram illustrating functional blocks in a system incorporating a PMIC and an SoC, in accord with an example embodiment of the present invention.

FIG. 1 is a simplified block diagram illustrating functional blocks in a system incorporating a PMIC and an SoC, in accord with an example embodiment of the present invention. PMIC 110 is coupled with SoC 140 to provide power to the SoC and also coupled to communicate between them. PMIC 110 includes a power generation module 115 that is configured to provide variable power levels, including voltage $V_{CORE}$ to processor cores 150. Power generation can be provided by a variety of circuits, including, for example, a combination of buck regulators, linear regulators, and the like. Power generation is controlled by a SVS/DVS module that can determine how power levels are modified in response to requests from SoC 140. Control logic 125 is configured to receive communication from SoC 140 via a communication interface 130. Such communication can include requests to increase or decrease power to the SoC. In response to such requests, in a typical PMIC, control logic 125 controls SVS/DVS module 120 (e.g., a digital to analog converter) to alter the power provided to the SoC. This operation is modified in embodiments of the present system, as will be discussed more fully below.

Communication interface 130 is configured to communicate with a corresponding communication interface 135 in SoC 140. Communication interfaces 130 and 135 can communicate using a variety of integrated circuit communication protocols, including, for example, I²C and SPI. SoC 140 can be one of a variety of multi-core applications processors, including a microcontroller unit, utilized in an environment exposed to potential malicious access activity (e.g., hacking). A system interconnect 145 communicatively couples all illustrated components of the multi-core applications processor. A set of processor cores 150 are coupled to system interconnect 145. Each processor core includes at least one CPU and local cache memory. Further coupled to the system interconnect are input/output devices 155 that can include the necessary input/output devices for applications provided by the SoC (e.g., a display and touch screen input device) and one or more network ports operable to connect to a network within the vehicle or to a network external to the vehicle. Other peripherals or peripheral controllers 160 and other subsystems 170 can be included in SoC 140. Peripherals 160 can include, for example, circuitry to perform power management, flash memory management, interconnect management, USB, and other PHY tasks. SoC 140 further includes a system memory 173 (including a memory controller), which is interconnected to the foregoing portions of the SoC by system interconnect 145. System memory 173 further can include, for example, an operating system and other software associated with tasks performed by SoC 140. It should be noted that the illustrated components of SoC 140 are provided by way of example and are not intended to be limiting.

As discussed above, in a traditional PMIC/SoC system, software executing on a processor 150 in SoC 140 can request modification of $V_{CORE}$ in association with a task being performed by the SoC. A request for power alteration can be provided by communication interface 135 to PMIC 110, either directly by the processor core or by a power management peripheral. PMIC 110 receives the request at communication interface 130 which is provided to control logic 125 for execution. Without any further checks, the SVS/DVS module 120 is instructed to alter the power to the SoC as requested, since the PMIC assumes that the request came from an authorized source (e.g., the connected SoC).

But in light of the connected environment that includes PMIC 110 and SoC 140, software executing on SoC 140 cannot necessarily be assumed to be uncompromised. In a situation in which the software has been compromised, instructions can be issued from SoC 140 that would request PMIC 110 to provide power levels outside of the nominal operational range of SoC 140. For this reason, embodiments of the present system include additional features to perform a check on requested power levels.

PMIC control logic 125 is coupled to a one-time programmable (OTP) memory 175 (e.g., fuses) that can provide pre-set limits for voltage range and other parameters. These pre-set limits can be stored by the PMIC manufacturer or by a manufacturer of the vehicle within which the system 100 is located. As illustrated, OTP memory 175 includes a value for a positive clamp 176 and a negative clamp 177. In this example, the positive clamp and the negative clamp are mask values representing a number of voltage step increments from a nominal value that cannot be modified by software executing on SoC 140. Once the clamps are configured, control logic 125 in PMIC 110 compares a SVS/DVS software request provided by SoC 140 with the hardware coded clamps to authorize or not the change of $V_{CORE}$. The use of the OTP positive clamp 176 and negative clamp 177 will be discussed in further detail below.

In addition, an internal counter register 126 can be provided in PMIC 110 to track the occurrences of SVS/DVS software request outside of the allowed values. At a predetermined point, the PMIC can transition system 100 into a safe state or completely switch off the application such that only a key off/key on sequence at the vehicle level, for example, is possible to recover. OTP memory 175 provides a corrupted counter 178 and a safety reaction configuration 179 that controls these reactions, as will be discussed in further detail below. PMIC 110 also provides a PMIC_INTb 180 pin driven by the PMIC to provide an interrupt signal to SoC 140 when there has been a corrupted SVS/DVS event through a corresponding SOC_INTb pin 185. PMIC 110 also provides a PMIC_RSTb pin 190 driven by the PMIC to reset SoC 140 when needed through a corresponding SOC_RSTb pin 195. PMIC 110 can also provide a safe state signal to a system-wide module (not shown) that can transition system 100 into a safe state when the threshold counts are exceeded.

Figure 2:
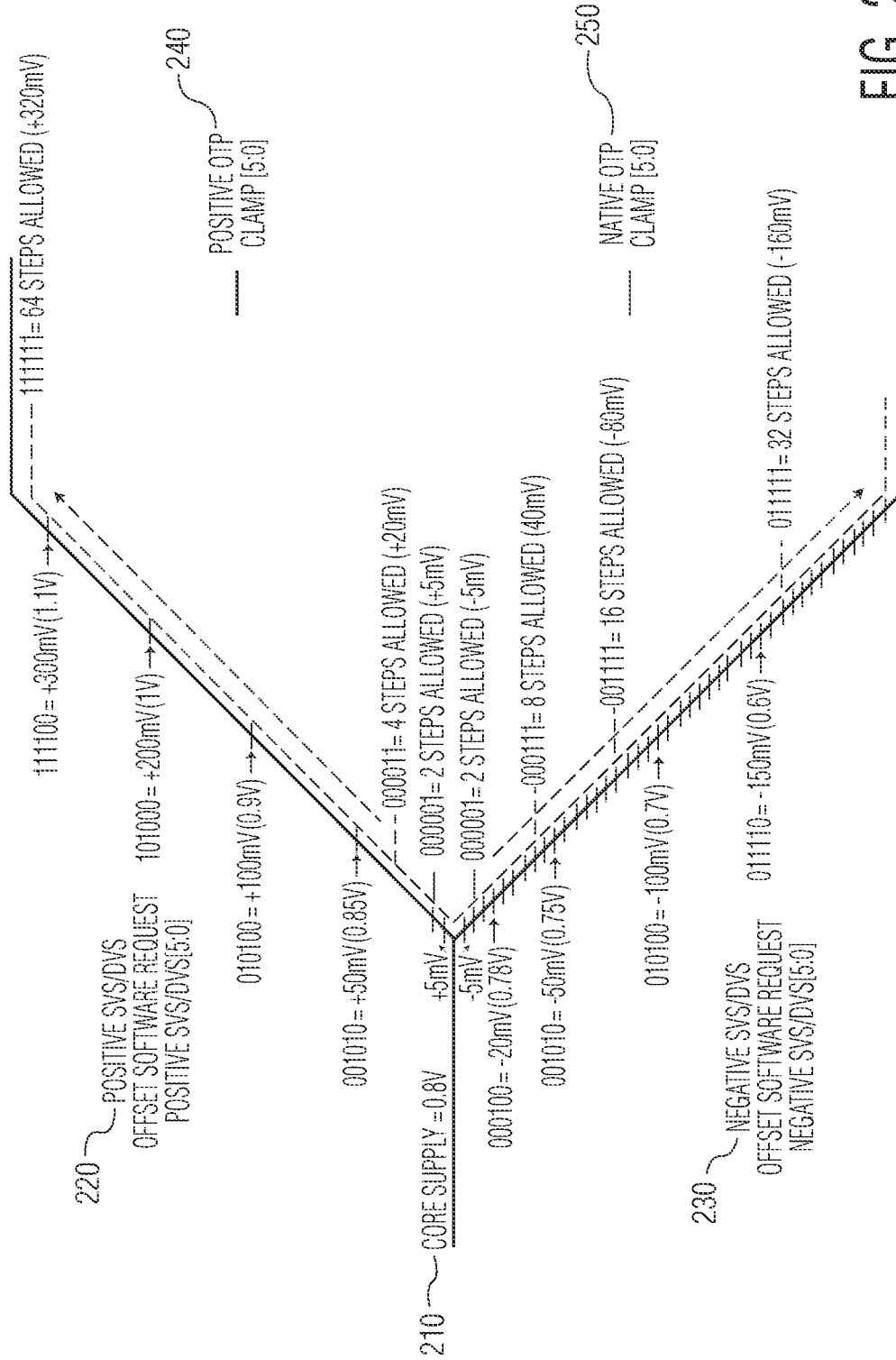
FIG. 2 is a simplified block diagram illustrating an example of an implementation of an embodiment of the present system.

FIG. 2 is a simplified block diagram illustrating an example of voltage steps in an implementation of an embodiment of the present system. A voltage scaling range of the core power supply is set by software using six bits, for example. One voltage step in the figure corresponds to a change of ±5 mV for the processor core supply voltage, which is initially set to 0.8 V (210). Software request values are illustrated on the left side of the figure with either positive software requests (220) or negative software requests (230). Voltage clamp values are illustrated on the right side of the figure with either positive voltage clamps (240) or negative voltage clamps (250). As discussed above, the voltage clamp values are hard coded in the PMIC using OTP memory, such as fuses. The OTP memory is programmed during production test at the supplier site and will typically be set to limit the PMIC to provide voltage values to an SoC within the stable range of the SoC. Once the SoC requests a negative or positive offset value, which can be inserted in a "positive SVS/DVS [5:0]" or "negative SVS/DVS [5:0]" register in control logic 125 or SVS/DVS block 120 of the PMIC, the PMIC compares the software request with positive clamp 176 or negative clamp 177.

Figure 3:
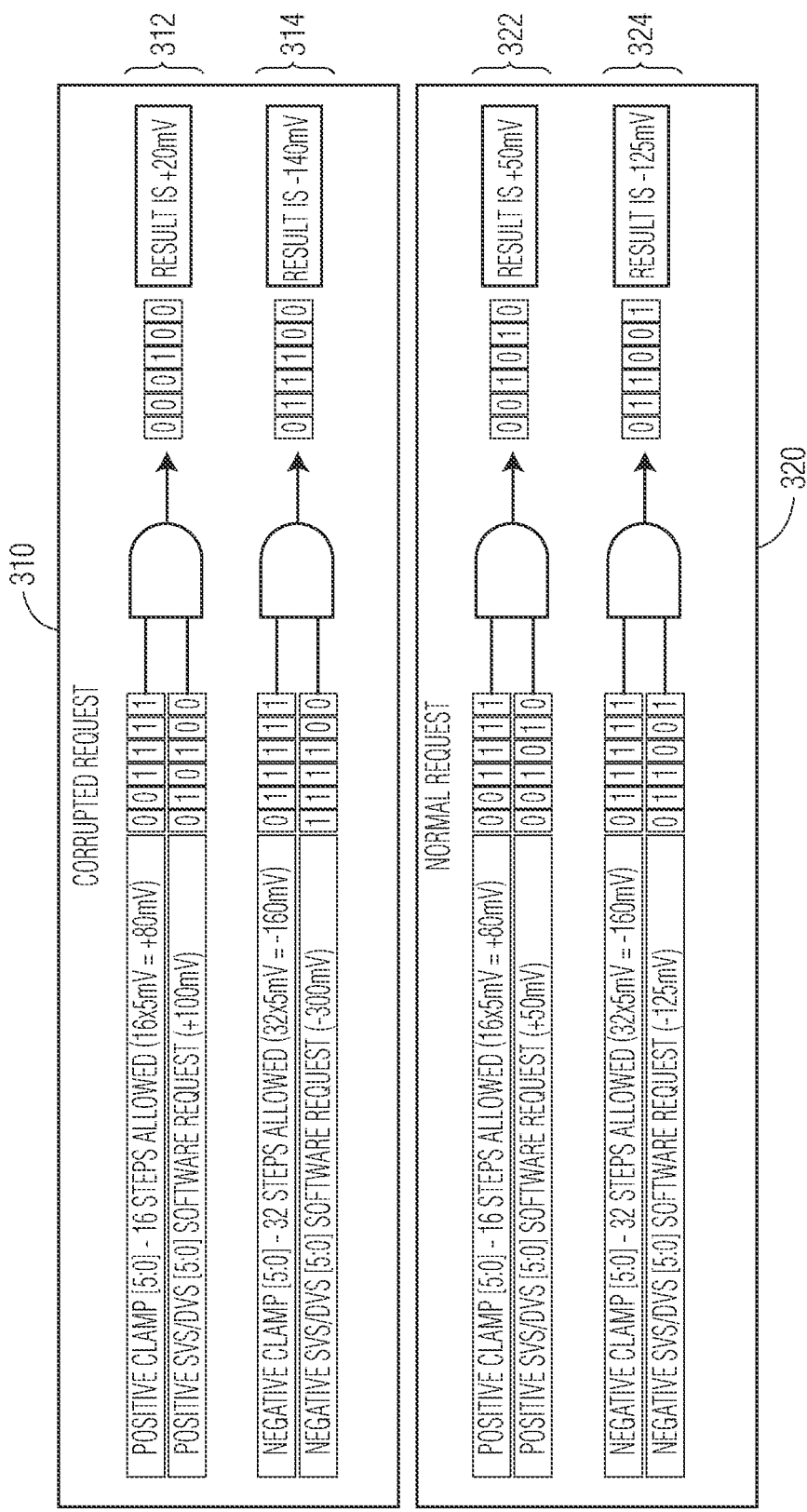
FIG. 3 illustrates a method for performing a comparison between the requested positive or negative SVS/DVS offset value and the set positive clamp or negative clamp, respectively.

FIG. 3 illustrates a method for performing the comparison between the requested positive or negative SVS/DVS offset value and the OTP set positive clamp 176 or negative clamp 177, respectively. The "positive clamp [5:0]" or "negative clamp [5:0]" acts as a mask of the "positive SVS/DVS [5:0]" or "negative SVS/DVS [5:0]", respectively, using an AND gate. The output result of the AND operation will either be equal to or lower than the requested offset value, depending on whether the request is normal or corrupted. If a corrupted request is received, the PMIC will not change the output voltage and will inform the SoC by sending an interrupt pulse (e.g., PMIC_INTb 180).

FIG. 3 illustrates two corrupted request events 310 and two normal request events 320. In the first corrupted offset request event 312, a positive clamp is set at 80 mV, which is 16 five millivolt steps—providing a mask value of 001111. The SoC provides a positive SVS/DVS offset request of 100 mV, which is 20 five millivolt steps—with a request value of 010100. The AND operation results in 000100, or 20 mV, which is less than the requested value. The PMIC compares the result of the AND operation with the original request value. Since the values will not match in this case, the PMIC will set an interrupt pulse to the SoC. As will be discussed more fully below, other operations can also be performed.

In the second corrupted request event 314, a negative claim is set at −160 mV, which is 32 five millivolt steps (mask value 011111). The SoC provides a negative SVS/DVS offset request of −300 mV, which is 60 five millivolt steps (request value 111100). The AND operation results in 011100, or −140 mV, which is less than the requested value.

In the first normal offset request event 322, a positive clamp is set at 80 mV, which again is 16 five millivolt steps (mask value 001111). The SoC provides a positive SVS/DVS offset request of 50 mV, which is 10 five millivolt steps (request value 001010). The AND operation results in 001010, which is the same as the request value. The PMIC will make the comparison between the AND result and the requested value, and since the values match, the PMIC will adjust the core voltage accordingly.

In the second normal offset request event 324, a negative clamp value is set at 160 mV, which again has a mask value of 011111. The SoC provides a negative SVS/DVS offset request of −125 mV, which is 25 five millivolt steps (request value 011001). The AND operation results in the same value as that of the request, and the PMIC will adjust the core voltage accordingly.

For dynamic voltage scaling, the process for receiving requested voltage offsets and checking those requests against the clamp values is continuous. Each time the SoC requests a voltage offset change, the PMIC will determine whether the request is normal or corrupted, and if corrupted, provide information back to the SoC regarding that request.

A situation in which the SoC provides the PMIC with multiple corrupted voltage offsets may be evidence of a high likelihood of a hacking situation. In order to capture such a situation, a PMIC can include one or more counters to track the number of corrupted trials and a mechanism to react when the counter exceeds a threshold value. A customer or the provider of the PMIC can set the thresholds and the reaction using one or more fuses in the one-time programmable memory.

FIG. 2 provides a corrupted counter 178 in the one-time programmable memory that can set an allowed number of authorized corrupt offset request trials before the PMIC calls for the SoC to take further action. Table 1, below, is an example of settings for the corrupted counter.

TABLE 1

| Corrupted Counter [1:0] | | Configuration |
| --- | --- | --- |
| 0 | 0 | Disabled (infinite trials allowed) |
| 0 | 1 | 4 corrupted trials allowed |
| 1 | 0 | 8 corrupted trials allowed |
| 1 | 1 | 16 corrupted trials allowed |

FIG. 2 also provides a safety reaction configuration 179 variable in the one-time programmable memory that is set to define the safety reaction of the PMIC/SoC once the corrupted counter reaches the set maximum value. Table 2, below, is an example of settings for the safety reaction variable.

TABLE 2

| Safety Reaction CFG | Configuration |
| --- | --- |
| 0 | Safe State |
| 1 | Deep Fail Safe |

In this example, the safety reaction configuration allows the customer or the provider of the PMIC/SoC system to decide whether the system should only go into a safe state in reaction to the corrupted counter exceeding the set threshold, or to go into a fail safe mode that is only recoverable by, for example, turning off a vehicle in which the system is installed and restarting the vehicle.

Figure 4:
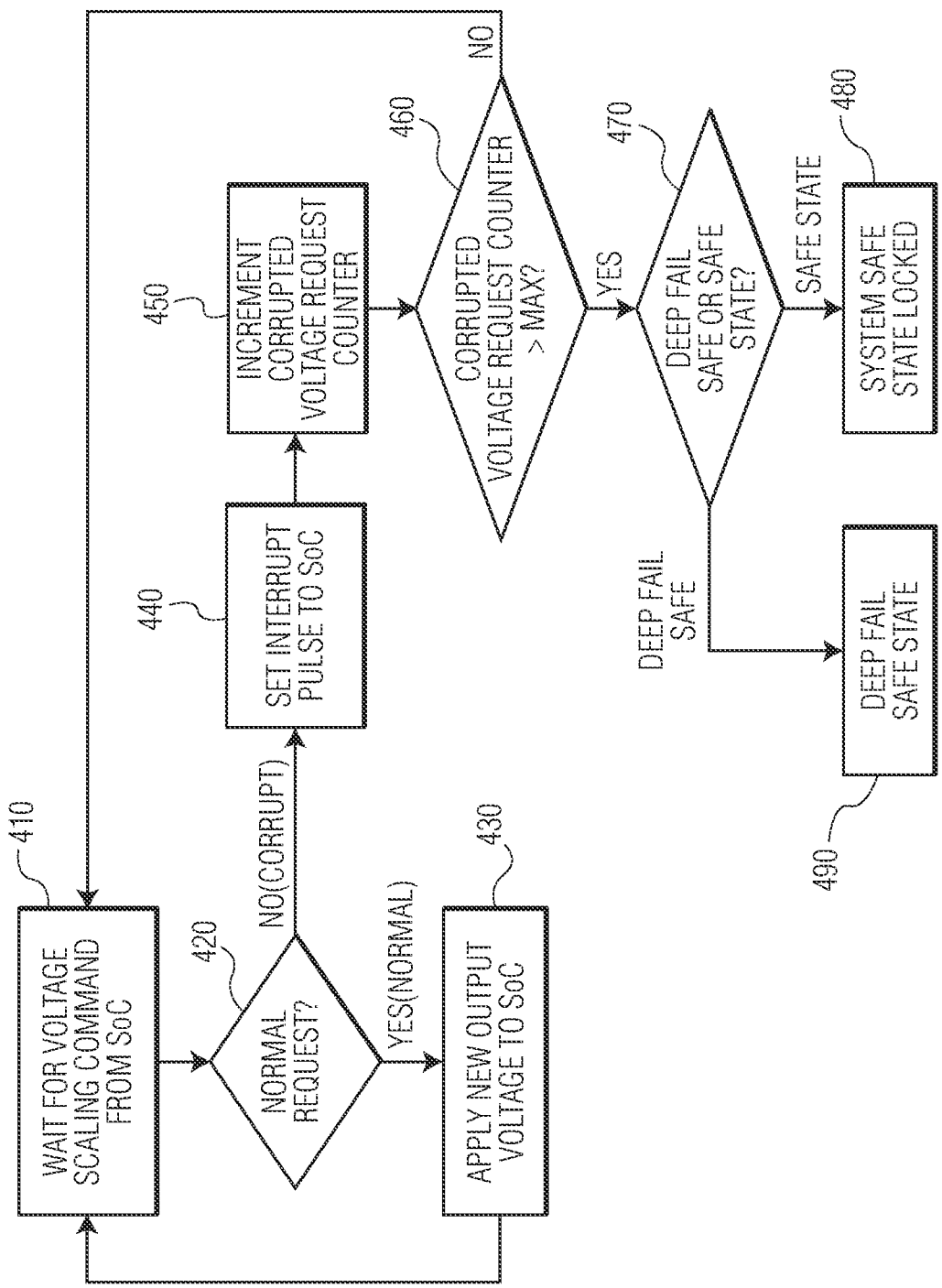
FIG. 4 is a simplified flow diagram illustrating an example of a process flow implemented by a PMIC providing DVS power scaling, in accord with an embodiment of the present system.

FIG. 4 is a simplified flow diagram illustrating an example of a process flow implemented by a PMIC providing DVS power scaling, in accord with an embodiment of the present system. While the PMIC is providing power to the SoC, the PMIC waits for a voltage scaling command from the SoC (410). As discussed above, the voltage scaling command is provided to the SoC at a communications interface (e.g., 130) using a protocol such as SPI or I²C. Once received, the PMIC determines if the requested voltage offset is within the parameters of a normal request (420) or if the requested voltage is indicative of a corrupt request. One mechanism for determining whether the request is within the parameters of the PMIC/SoC system is checking the requested offset against a pre-set positive or negative clamp stored in a one-time programmable memory (e.g., positive clamp 176 or negative clamp 177). In one example, the requested voltage offset and the clamp value are provided to an AND gate. If the result of the AND operation is the same as the requested value, then the requested voltage is a normal request and the requested new output voltage can be provided to the SoC (430). Subsequently, the PMIC can return to waiting for a new request from the SoC (410).

If the result of the AND operation is not the same as the requested value, then the requested voltage offset is a corrupt request and the PMIC proceeds to respond to the corrupt request. The PMIC can set an interrupt pulse to be received by the SoC (440). As discussed above, one mechanism for providing the interrupt pulse is to set an output pin PMIC_INTb which is read by a corresponding input pin on the SoC (e.g., SOC_INTb 185). The SoC can respond to the received interrupt in a manner appropriate for the executing application.

In response to the corrupt voltage change request, the PMIC can further increment a corrupted voltage request counter (450) and then determine whether the counter is higher than a predetermined threshold value (460). The threshold value can be set, for example, using a corrupted counter variable (e.g., 178) stored in the one-time programmable memory. If the counter is not higher than the threshold value, then the PMIC returns to waiting for another voltage scaling request (410). If the counter is higher than the threshold value, this is indicative of a likely malicious access event. The system can then determine whether to send the PMIC/SoC system into a safe state or a deep fail safe state (470). As discussed above, this determination can be made by referencing a pre-set variable indicating the system or vehicle manufacturer's preference (e.g., safety reaction cfg 179). Depending upon the preference, the system can then be set into a safe state (480) or deep fail safe state (490).

In one example, safe state is entered by the PMIC sending a safe state signal to impacted portions of the system incorporating the PMIC and SoC. Safe state will often involve restricting network communications received by the SoC. A deep fail safe state will include not only transitioning the system to a safe state, but also switching off all the power supply rails including the core supply. In the deep fail safe state, only a system reset (e.g., key off/key on of a vehicle) will recover the system, thereby ensuring that the malicious access is halted.

Figure 5:
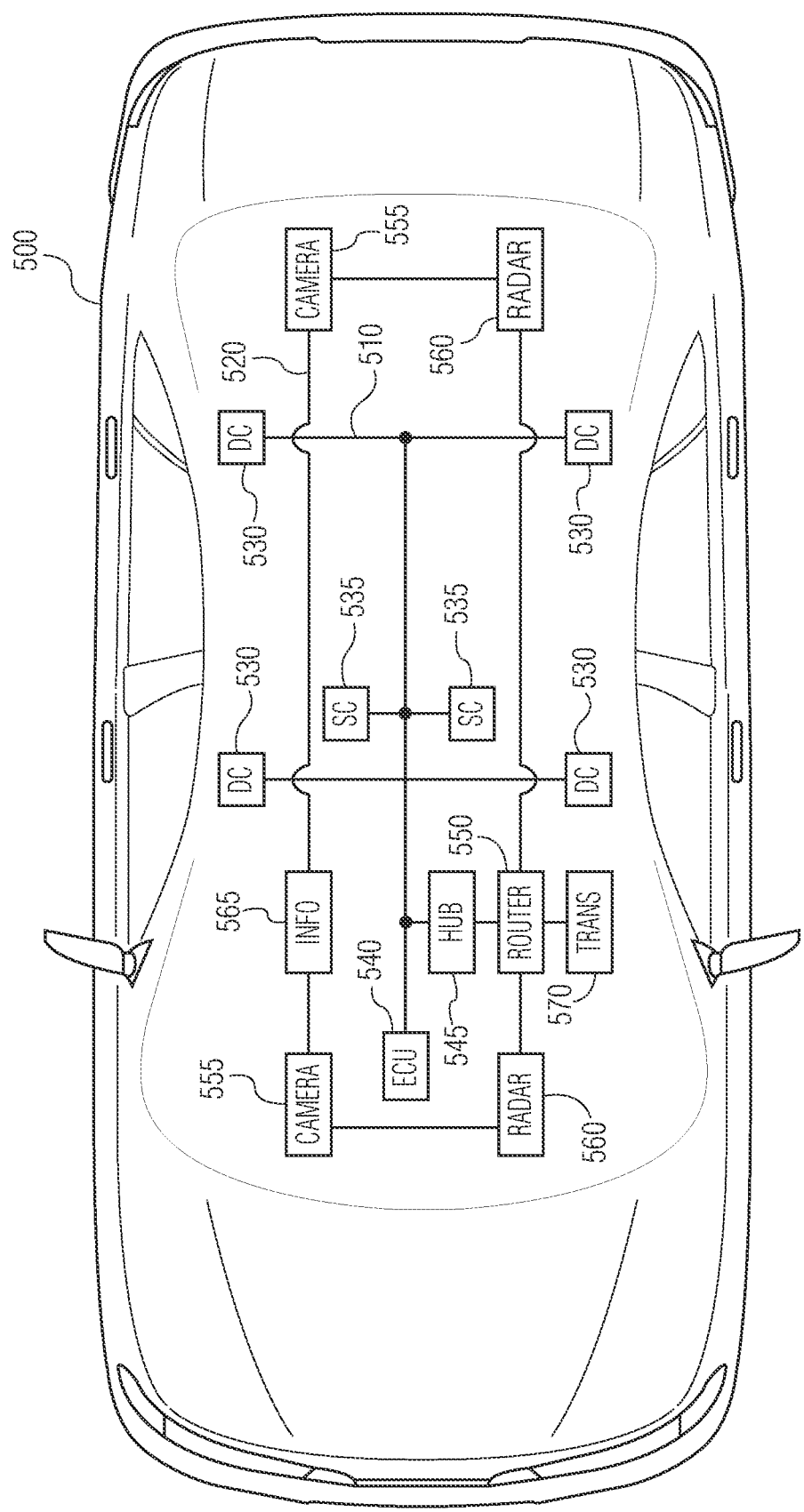
FIG. 5 is an example of a vehicular environment incorporating one or more PMIC/SoC systems of the present system.

FIG. 5 is an example of a vehicular environment incorporating one or more PMIC/SoC systems of the present system. A vehicle 500 can be one of a variety of transports such as an automobile, a truck, a tractor-trailer cab, a train, an airplane, and the like. Vehicle 500 incorporates two networks, a slow data rate network 510 (e.g., a controller area network (CAN) or flexible data rate network (CAN FD)) and a high data rate network 520 (e.g., an Ethernet protocol network). Multiple networks can be provided to allow lower power consumption processor nodes to communicate on the slow data rate network, while nodes requiring faster communication rates can reside on the high data rate network.

Sensors and processors can be of many varying types in a modern vehicles. Slower data rate sensors and processors on slow data rate network 510 can include, for example, door controllers 530, seat controllers 535, and engine controller unit 540. Door controllers 530 can control different functions and sensors present in each door of the vehicle, such as mirrors, windows, side air bags, and locks. Seat controllers 535 can control differing seat functions such as movement of the seats, seat heaters, and head rests. The engine controller unit 540 can control differing functions of the engine and can include a number of processors and sensors for differing engine tasks. Slow data rate network 510 can also include a hub 545 (e.g., a CAN hub) that controls network communication on the network. Hub 545 can also serve as a communication link to a router 550 coupled to high data rate network 520.

High data rate network 520 can include sensor and processor modules communicate higher volumes of data (e.g., video) and also provide that information to a driver or external to the vehicle. Such sensor and processor modules can include, for example, cameras 555, radars 560, and infotainment system 565. Router 550 can also be coupled to a transceiver 570 configured to exchange data with other vehicles or infrastructure.

Embodiments of the described PMIC protect against violating a SoC power supply by accidentally or maliciously programming voltage scaling of the PMIC outside of the operating range window of the SoC, which could consequently force the SoC into a quasi-stable or unstable condition. Embodiments include a SoC alert and abort function that is asserted after multiple persistent out-of-range power scaling commands from the SoC. Embodiments cover different root cause situations, such as hacking (e.g., intentional) or software error (e.g., accidental).

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the bit locations of a value. For example, "positive clamp [5:0]" or "negative clamp [5:0]" indicates the five lower order bits of an address value.

By now it should be appreciated that there has been provided a method for providing power to a system-on-a-chip. The method includes providing a first voltage to the SoC, determining whether a requested change in voltage from the SoC is within a predetermined voltage range, applying the requested change in voltage to the SoC if the requested change is within the predetermined voltage range, and informing the SoC that the requested change in voltage is outside the predetermined voltage range if the requested change is outside the predetermined voltage range.

In one aspect of the above embodiment, said informing the SoC includes providing and interrupts signal to the SoC. In another aspect of the above embodiment, the method further includes incrementing a counter if the requested voltage is outside the predetermined voltage range, determining if the counter is above a pre-set threshold, and sending a command to the SoC to enter a protective state if the counter is above the pre-set threshold. In a further aspect, the protective state is one of a safe state or a deep fail safe state. In still a further aspect, the protective state is determined to be the safe state or the deep fail safe state in light of a pre-set safety reaction configuration variable value.

In another aspect, said determining whether the requested change in voltage from the SoC is within a predetermined voltage range includes storing a positive clamp value representing a highest positive voltage offset from a nominal voltage value, storing a negative clamp value representing a highest negative voltage offset from the nominal voltage value, and comparing the requested change in voltage from the SoC to one of the positive clamp value and the negative clamp value. In a further aspect, said comparing the requested change in voltage to one of the positive clamp value and the negative clamp value includes performing a logical AND on the requested change in voltage to the SoC and the one of the positive clamp value and the negative clamp value, and determining if a result of logical AND equals the requested change in voltage. In another further aspect, the requested change in voltage, the positive clamp value, and the negative clamp value are measured in fixed voltage step increments from the nominal voltage value. In still another further aspect, the method further includes storing the positive clamp value and the negative clamp value in a one-time programmable memory.

Another embodiment provides a power management integrated circuit (PMIC) coupled to a system-on-a-chip (SoC). The PMIC includes a power generation module coupled to the SoC, a communication interface coupled to the SoC, and a control logic coupled to the power generation module and the communication interface. The power generation module is configured to provide a voltage to the SoC. The communication interface is configured to receive a request to change voltage from the SoC. The control logic is configured to determine whether the requested change in voltage from the SoC is within a predetermined voltage range, instruct the power generation module to apply the requested change in voltage to the SoC if the requested changes within the predetermined voltage range, and inform the SoC that the requested change in voltage is outside the predetermined voltage range if the requested changes outside the predetermined voltage range.

One aspect of the above embodiment further includes an interrupt signal output port coupled to the control logic and interrupt signal input port of the SoC. The interrupt signal output port is configured to transmit and interrupts signal to the SoC from the PMIC where said informing the SoC that the requested change in voltage is outside the predetermined voltage range includes transmitting the interrupts signal to the SoC.

In another aspect of the above embodiment, the control logic further includes a counter register where the control logic is further configured to increment the counter register if the requested voltage is outside the predetermined voltage range, determine if the counter registers above a pre-set threshold, and send a command to the SoC to enter a protective state if the counter registers above the pre-set threshold. A further aspect includes a reset signal output port coupled to the control logic and a corresponding reset signal input port of the SoC. The reset signal output port is configured to transmit a reset signal to the SoC from the PMIC where said sending the command to enter the protective state includes transmitting the reset signal to the SoC. Another further aspect includes a one-time programmable memory coupled to the control logic. The one-time programmable memory stores a configuration variable setting the protective state where the protective state is one of the safe state or a deep fail safe state.

Another aspect further includes a one-time programmable memory coupled to the control logic and storing a plurality of configuration variables. The plurality of configuration variables includes a positive clamp value representing a highest positive voltage offset from a nominal voltage value, and a negative clamp value representing a highest negative voltage offset from the nominal voltage value. In a further aspect, the control logic performing said determining whether the requested change in voltage from the SoC is within a predetermined range includes the control logic being configured to compare the requested change in voltage from the SoC to one of the positive clamp value and the negative clamp value. In a further aspect, the control logic performing said comparing the requested change in voltage from the SoC to one of the positive clamp value and the negative clamp value includes the control logic being configured to perform a logical AND on the requested change in voltage to the SoC and the one of the positive clamp value and the negative clamp value, and determine if a result of the logical AND equals the requested change in voltage. In another further aspect, the requested change in voltage, the positive clamp value, and the negative clamp value are measured in fixed voltage step increments from the nominal voltage value.

Another embodiment is a vehicle including a plurality of network nodes where one of the network nodes includes a microcontroller unit (MCU), a network communicatively coupling the plurality of network nodes, and a power management integrated circuit (PMIC) coupled to the MCU. The PMIC includes a power generation module coupled to the MCU, a communication interface coupled to the MCU, and a control logic coupled to the power generation module and the communication interface. The power generation module is configured to provide a voltage to the MCU. The communication interface is configured to receive a request to change voltage from the MCU. The control logic is configured to determine whether the requested change in voltage from the MCU is within a predetermined voltage range, instruct the power generation module to apply the requested change in voltage to the MCU if the requested changes within the predetermined voltage range, and inform the MCU that the requested change in voltage is outside the predetermined voltage range if the requested change is outside the predetermined voltage range. In one aspect of the above embodiment, the PMIC control logic further includes a counter register where the control logic is further configured to increment the counter register if the requested voltage is outside the predetermined voltage range, determine if the counter registers above a pre-set threshold, and send a command to the MCU to enter a protective state if the counters above the pre-set threshold.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled." to each other to achieve the desired functionality.

Also, for example, in one embodiment, the illustrated elements of system 100 are circuitry located within a same device. Alternatively, system 100 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of embodiments of the present invention as set forth in the claims below. For example, a vehicle incorporating a PMIC and SoC providing an embodiment of the present invention is illustrated as an automobile, but can also include any vehicle incorporating SoC's having processors that are coupled via a network (e.g., an automobile, a truck, a train, an airplane, and the like). Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for providing power to a system-on-a-chip (SoC), the method comprising:
   providing a first voltage to the SoC;
   determining whether a requested change in voltage from the SoC is within a predetermined voltage range, the determining comprising:
      storing a positive clamp value representing a highest positive voltage offset from a nominal voltage value;
      storing a negative clamp value representing a highest negative voltage offset from the nominal voltage value; and
      comparing the requested change in voltage from the SoC to one of the positive clamp value and the negative clamp value, wherein the comparing includes performing a logical AND on the requested change in voltage to the SoC and the one of the positive clamp value and the negative clamp value, and determining whether a result of the logical AND equals the requested change in voltage;
   applying the requested change in voltage to the SoC when the requested change is within the predetermined voltage range; and
   informing the SoC that the requested change in voltage is outside the predetermined voltage range when the requested change is outside the predetermined voltage range.

2. The method of claim 1 wherein said informing the SoC comprises providing an interrupt signal to the SoC.

3. The method of claim 1 further comprising:
   incrementing a counter when the requested voltage is outside the predetermined voltage range;
   determining if the counter is above a pre-set threshold;
   sending a command to the SoC to enter a protective state when the counter is above the pre-set threshold.

4. The method of claim 3 wherein the protective state is one of a safe state or a deep fail safe state.

5. The method of claim 4 wherein the protective state is determined to be the safe state or the deep fail safe state in light of a pre-set safety reaction configuration variable value.

6. A power management integrated circuit (PMIC), coupled to a system-on-a-chip (SoC), the PMIC comprising:
   a power generation module, coupled to the SoC, and configured to provide a voltage to the SoC;
   a communication interface, coupled to the SoC, and configured to receive a request to change voltage from the SoC;
   a control logic, coupled to the power generation module and the communication interface, and configured to
      determine whether the requested change in voltage from the SoC is within a predetermined voltage range by comparing the requested change in voltage from the SoC to one of a positive clamp value and a negative clamp value,
      instruct the power generation module to apply the requested change in voltage to the SoC when the requested change is within the predetermined voltage range, and
      inform the SoC that the requested change in voltage is outside the predetermined voltage range when the requested change is outside the predetermined voltage range; and
   a one-time programmable memory, coupled to the control logic, and storing a plurality of configuration variables, wherein the plurality of configuration variables comprises:
      the positive clamp value representing a highest positive voltage offset from a nominal voltage value, and
      the negative clamp value representing a highest negative voltage offset from the nominal voltage value.

7. The PMIC of claim 6 further comprising:
an interrupt signal output port, coupled to the control logic and an interrupt signal input port of the SoC, and configured to transmit an interrupt signal to the SoC from the PMIC, wherein said informing the SoC that the requested change in voltage is outside the predetermined voltage range comprises transmitting the interrupt signal to the SoC.

8. The PMIC of claim 6 wherein the control logic further comprises:
a counter register, wherein the control logic is further configured to
increment the counter register when the requested voltage is outside the predetermined voltage range,
determine if the counter register is above a pre-set threshold, and
send a command to the SoC to enter a protective state when the counter register is above the pre-set threshold.

9. The PMIC of claim 8 further comprising:
a reset signal output port, coupled to the control logic and a corresponding reset signal input port of the SoC, and configured to transmit a reset signal to the SoC from the PMIC, wherein said sending the command to enter the protective state comprises transmitting the reset signal to the SoC.

10. The PMIC of claim 8 further comprising:
a one-time programmable memory, coupled to the control logic, and storing a configuration variable setting the protective state, wherein the protective state is one of a safe state or a deep fail safe state.

11. A vehicle comprising:
a plurality of network nodes, wherein one of the network nodes comprises a system-on-a-chip (SoC);
a network communicatively coupling the plurality of network nodes; and
a power management integrated circuit (PMIC) coupled to the SoC, the PMIC comprising:
a power generation module, coupled to the SoC, and configured to provide a voltage to the SoC;
a communication interface, coupled to the SoC, and configured to receive a request to change voltage from the SoC;
a control logic, coupled to the power generation module and the communication interface, and configured to
determine whether the requested change in voltage from the SoC is within a predetermined voltage range by comparing the requested change in voltage from the SoC to one of a positive clamp value and a negative clamp value,
instruct the power generation module to apply the requested change in voltage to the SoC when the requested change is within the predetermined voltage range, and
inform the SoC that the requested change in voltage is outside the predetermined voltage range when the requested change is outside the predetermined voltage range; and
a one-time programmable memory, coupled to the control logic, and storing a plurality of configuration variables, wherein the plurality of configuration variables comprises:
the positive clamp value representing a highest positive voltage offset from a nominal voltage value, and
the negative clamp value representing a highest negative voltage offset from the nominal voltage value.

12. The vehicle of claim 11 wherein the PMIC further comprises:
an interrupt signal output port, coupled to the control logic and an interrupt signal input port of the SoC, and configured to transmit an interrupt signal to the SoC from the PMIC, wherein said informing the SoC that the requested change in voltage is outside the predetermined voltage range comprises transmitting the interrupt signal to the SoC.

13. The vehicle of claim 11 wherein the control logic further comprises:
a counter register, wherein the control logic is further configured to
increment the counter register when the requested voltage is outside the predetermined voltage range,
determine if the counter register is above a pre-set threshold, and
send a command to the SoC to enter a protective state when the counter register is above the pre-set threshold.

14. The vehicle of claim 13 wherein the protective state is one of a safe state or a deep fail safe state.

15. The vehicle of claim 11 wherein the PMIC further comprises:
a reset signal output port, coupled to the control logic and a corresponding reset signal input port of the SoC, and configured to transmit a reset signal to the SoC from the PMIC.

16. The vehicle of claim 14, wherein the protective state is determined to be the safe state or the deep fail safe state in light of a pre-set safety reaction configuration variable value.

17. The vehicle of claim 14, wherein the control logic is further configured to recover from the deep fail safe state by turning off the vehicle and restarting the vehicle.

18. The vehicle of claim 14, wherein the one-time programmable memory is further configured to store a configuration variable setting the protective state.

19. The vehicle of claim 11, wherein the control logic is further configured to:
perform a logical AND on the requested change in voltage to the SoC and the one of the positive clamp value and the negative clamp value; and
determine whether a result of the logical AND equals the requested change in voltage.

20. The vehicle of claim 11, wherein the communication interface is configured to communicate using an integrated circuit communication protocol characterized as $I^2C$ or SRI.

* * * * *